Patented Nov. 8, 1932

1,886,933

UNITED STATES PATENT OFFICE

PAUL ASKENASY, OF KARLSRUHE, GERMANY

METHOD OF PRODUCING CONCRETE

No Drawing. Application filed November 20, 1930, Serial No. 497,057, and in Germany November 28, 1928.

This invention relates to a method of producing concrete or cement which is capable of resisting or withstanding the effects of sea-water.

In producing cement or concrete masses of this kind capable of withstanding the action of sea or salt water it has hitherto been usual to build up the concrete from ordinary cement (Portland cement, etc.) mixed with water-repelling materials, or from alumina (fused) cement.

In lieu of this it has also been proposed to apply to the surface of the concrete coatings or paints intended to prevent the penetration of the salt solutions.

The first of the mixtures above referred to is only effective as far as ordinary water is concerned, while the use of alumina cement is, at least in the majority of cases, prohibited by the relatively high cost. Coating of the cement or concrete is practically useless. Penetration of the sea-water through small cracks is not to be avoided, and a destructive process sets in, which is not outwardly visible but is accordingly all the more dangerous.

It is the primary object of the present invention to overcome the drawbacks referred to, and to provide a cement which will resist any action on the part of the sea or salt water.

Other objects and advantages obtained will become apparent as the description proceeds.

I have discovered that concrete masses capable of withstanding the action of sea-water may be obtained with the use of ordinary Portland cement, furnace cement, etc., without other auxiliary means, by adding to the cement or to the concrete mass being produced the very finely divided ash produced especially by the combustion of coal in pulverulent form in the coal-dust-firing process.

This substance is mixed with the remaining constituents of the concrete at any desired stage during the production. They may be added to the single constituents employed, or to the concrete mass after the same has been finally mixed. It is, however, preferable to add the fine coal-dust-ash during the disintegration of the slag, so that a particularly good mixture and commingling of the parts is obtained in the mixing apparatus. On the other hand it is also possible to add the ash to the concrete in the drum at the site of operations.

The percentage of coal-dust-ash, which if necessary may also contain a small proportion of coal, may in the finished concrete vary within wide limits. A mixture which has been found extremely suitable consists of 70 parts cement, 30 parts of powder ash and 300 parts sand. Innumerable other proportions will, however, also be found perfectly satisfactory.

On the occasion of standard tests which have been carried out extremely good results were obtained with the mixture above referred to.

If standard mixtures of this and a similar kind employing Portland cement of the ordinary or a high-class quality or also any other kind of cement are treated with brine or salt solutions, for example solutions containing 20% ammonium sulphate, they display a resistance to sea-water which is wholly or practically equal to that of fused cement. Neither cracks nor crumbling of the edges or corners nor a washing away of the concrete mass will be observed. In point of fact absolutely no action is noticeable on the concrete at all, and the latter displays exactly the same behaviour towards sea-water as fused cements which, as already mentioned, are known to be resistant to sea-water or other equivalent solutions.

A behaviour of this kind was not to be foreseen, as no apparent reason exists why the addition of a finely divided ash to cement of any kind should impart to the latter any particular effect. The coal-dust-ash here concerned represents a substance which, if not in all cases, nevertheless in innumerable instances, will be found to resist the action of chemical reagents, for example acids. Thus, for example, in the case of ash taken from the combustion of pulverulent coal and treated with acid, only a very low percentage could be dissolved out, while in the case of concrete or cement the latter substances obviously undergo a reaction with the constituents of the ash, as shown by the behaviour of coal-dust-concrete afterwards. It is highly probable that the constitutents of the ash contain silicic acid, etc., in a strong reactional form. This apparently causes a rapid reaction between the free lime or lime hydrate and the constituents of the ash, for example both hydrosilicates of lime as well as hydro-aluminates of lime being rapidly formed, which in turn are capable of relative reaction. In this manner it is quite possible that the coal-dust-ash constituents rapidly withdraw from the cement that proportion of lime which is liable to attack by ammonium sulphate, sea-water, etc., and thus impart to the cement the properties of resistance in question.

The extreme suitability of the ash was all the less to be expected, inasmuch as ash and slag taken, for example, from brown coal furnaces, have already been employed either as a filling material or as a substitute for the coarse additions to the concrete, and since an acid-resisting concrete mass of any particular suitability has neither been obtained by a mixture of cement and glowed quartz sand or by a mixture comprising cement and bauxite.

It is not the mere addition of the ash or slag itself which accomplishes the desired result, but the addition of ash especially derived from the combustion of pulverulent coal, and also the presence of the silicic acid and alumina in a state permitting of reaction.

It would, for example, not be sufficient to fuse in the coal-dust-ash with the raw materials when the cement is being produced, as the essential feature concerned is the action exerted by the constituents of the coal-dust-ash in the finished concrete during the hardening process.

It is not only possible in the manner described to obtain a concrete which represents a perfect substitute for concrete masses produced with the assistance of fused cements, without the necessity for employing other than the ordinary, cheap cements, but there is also associated with this method the advantage that the initial material concerned, for example the ash derived from the combustion of pulverulent coal, is extremely cheap and moreover is usually regarded as a very troublesome and inconvenient waste product.

The coal-dust-ash does not require to be free from lime, and may be readily employed if the percentage of lime is not excessive. Merely such an amount of alumina or silicic acid requires to be present that a complete binding of the lime of both origins is ensured. Iron oxide and other constituents are also admissible.

In the microscopic observation of coal-dust-ashes obtained from the combustion of pulverulent coal there are frequently to be observed, side by side, small particles of alumina, silicate of alumina, silicic acid, etc. It is even possible on occasion to separate therefrom, by washing or flotation, single of these constituents in more or less pure form.

The constituents thus divided out may be used singly or together for mixing with concrete. It may, for example, be desired to separate the constituents rich in iron from those containing less iron, or those rich in alumina from those containing less alumina, for mixing with concrete.

An additional advantage obtained from the addition of coal-dust-ash in the manner described consists in the fact that sulphurous constituents are mostly only present in very small quantities, whereas the additions employed, such as blast-furnace slag, usually contain a considerable percentage of sulphur.

It is naturally also possible to add the coal-dust-ash to all other concrete mixtures usually produced without the same, for example to produce porous cement or concrete masses therewith, envelop ordinary concrete masses with the same, or add the coal-dust-ash to mixtures for producing artificial stone, etc.

It has been proposed to employ as an acid-resisting addition in the production of a light, porous cement the small particles of ash which together with soot become deposited in the tubes of locomotive boilers. This appeared quite feasible in view of the foamy nature of these particles. Contrary thereto, the ash derived from the combustion of pulverulent coal does not possess foamy constituents of any kind, so that it is not possible by the simple addition thereof alone to cement to produce porous concrete masses, viz, because the surface of particles of pulverulent-coal ash is a completely different one.

The concrete mass produced according to the new method described in the above accordingly represents a considerable improvement in the art both from a technical as well as a commercial aspect.

It will be understood that no limitation is made to the exact embodiments described, and that various modifications are quite possible within the meaning of the above and the annexed claims without departing from the spirit of the invention.

What I claim as new and desire to secure by Letters Patent is:

1. A method of producing concrete capable of resisting sea-water and other equivalent solutions, consisting in adding to cement mixtures with the usual filling materials employed coal-dust-ash derived from the combustion of pulverulent coal.

2. A method of producing concrete capable of resisting sea-water and other equivalent solutions, consisting in adding to cement produced in the usual manner the coal-dustash obtained from the combustion of pulverulent coal.

3. A cement capable of resisting sea-water and other equivalent solutions, having admixed therewith in suitable proportion the coal-dust-ash derived from the combustion of pulverulent coal.

4. A concrete capable of resisting sea-water and other equivalent solutions, consisting of cement of the usual kind and normal filling materials with the addition of coal-dust-ash derived from the combustion of pulverulent coal.

5. A concrete capable of resisting sea-water and other equivalent solutions, comprising 70 parts cement, 30 parts coal-dust-ash derived from the combustion of pulverulent coal, and 300 parts sand.

In testimony whereof I affix my signature.

PAUL ASKENASY.